May 25, 1965 R. L. HOLLOWAY ETAL 3,185,368
FRICTION WELDING
Filed Jan. 10, 1961 8 Sheets-Sheet 1

INVENTORS.
ROBERT LEE HOLLOWAY
ALFRED EDWARD LEVENDOSKI
BY
ATTORNEY.

May 25, 1965 R. L. HOLLOWAY ETAL 3,185,368
FRICTION WELDING
Filed Jan. 10, 1961 8 Sheets-Sheet 5

INVENTORS.
ROBERT LEE HOLLOWAY
ALFRED EDWARD LEVENDOSKI
BY
*William A. Drury*
ATTORNEY.

May 25, 1965 R. L. HOLLOWAY ETAL 3,185,368
FRICTION WELDING
Filed Jan. 10, 1961 8 Sheets-Sheet 6

INVENTORS.
ROBERT LEE HOLLOWAY
ALFRED EDWARD LEVENDOSKI
BY
*William A. Drucker*
ATTORNEY.

United States Patent Office 3,185,368
Patented May 25, 1965

3,185,368
FRICTION WELDING
Robert Lee Holloway, Snyder, and Alfred Edward Levendoski, Depew, N.Y., assignors to American Machine & Foundry Company, a corporation of New Jersey
Filed Jan. 10, 1961, Ser. No. 81,791
17 Claims. (Cl. 228—2)

This invention relates in general to welding apparatus and, more particularly, to friction welding apparatus for welding large tubular members such as oil well drill string tool joints.

Heretofore, large, bulky and very costly apparatus was required to perform the high quality weld necessary to join tool joints to oil well drill pipe. Such conventional apparatus could not be truck-mounted to be used in the field near the site of the actual drilling. This required lengthy shipments to return drill pipe to a factory location if new tool joints were to be welded to it.

It is, therefore, an object of this invention to provide a lighter, less expensive, and less bulky welding apparatus for oil well drill pipe tool joints and the like which may be truck-mounted to be used in the field near the site of drilling operations.

Another object of this invention is to provide a welding apparatus for the butt welding of large tubular members which provides a superior weld in that the members to be welded are only heated in the immediate area of the weld.

A further object of this invention is to provide welding apparatus for butt welding tubular members which has a greatly lowered energy requirement to accomplish a given weld.

An additional object of this invention is to provide a welding apparatus for the butt welding of tubular members which contains an integral power source.

Many other objects, advantages and features of invention reside in the construction, arrangement and combination of parts involved in the embodiment of the invention and its practice as will be understood from the following description and accompanying drawing wherein:

Figures 3, 4, 5, 6, 7:
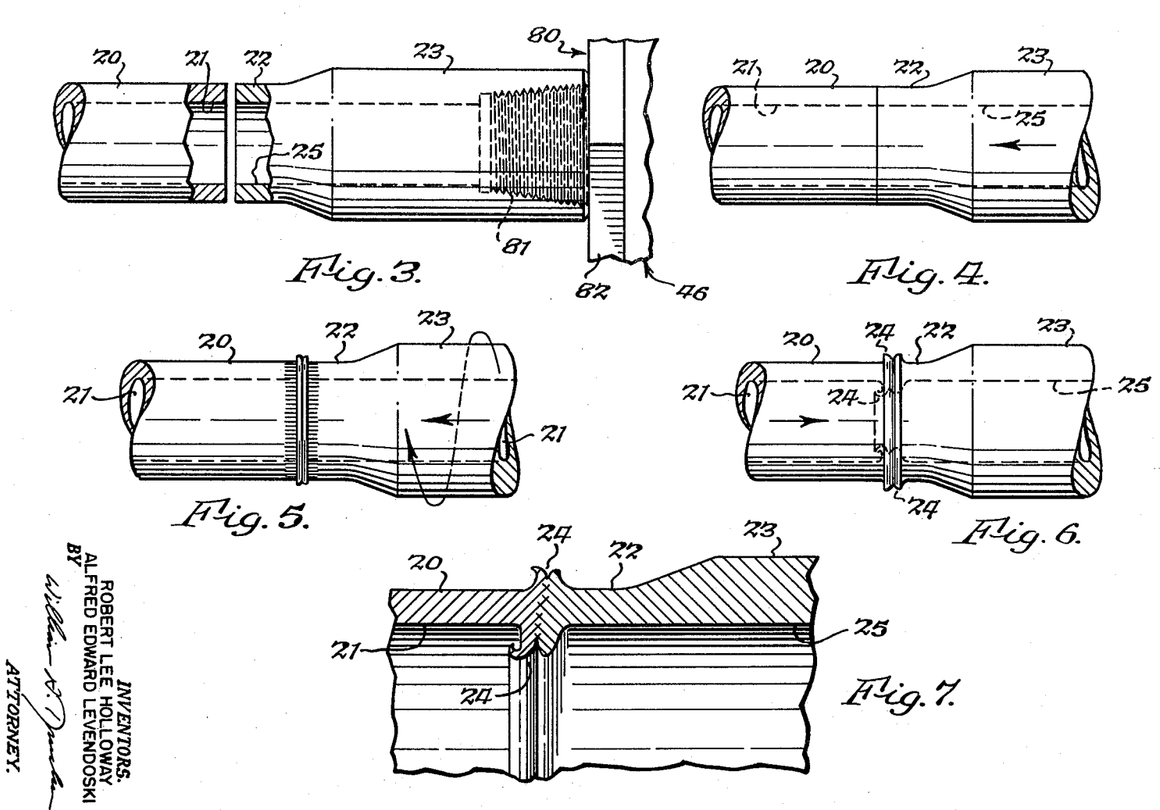
FIG. 3 shows the end of an oil well pipe and a tool joint which is secured to a fragment of the friction welding apparatus with the pipe and the tool joint partially broken away in section and with the pipe and the tool joint positioned relative to each other as they would be in the friction welding apparatus prior to being friction welded.
FIG. 4 shows the end of the drill pipe and a fragment of a tool joint brought into contact at the start of the welding cycle.
FIG. 5 shows the rotation of a fragment of a tool joint against the end of a drill pipe generating heat by friction and raising a bead at the point of contact.
FIG. 6 shows the movement of the drill pipe against the braked and now stationary fragment of the tool joint to complete the friction weld.
FIG. 7 is a longitudinal section through a fragment of a welded drill pipe and tool joint showing the form of the completed weld.

Referring to the drawings in detail, FIGS. 3 through 7 show the actual friction welding process. The end of a drill pipe 20, which contains the central channel 21, has the end 22 of a tool joint 23 pressed against it as illustrated in FIG. 4. The tool joint 23 contains the channel 25. As shown in FIG. 5, this pressure is continued while relative rotation is accomplished between the tool joint 23 and the pipe 20 so that frictional heat is developed in the area of contact between the pipe 20 and the tool joint 23. Depending on the speeds, pressures, materials, and the sizes of the pieces being welded, the frictional heat melts material in the area of contact as shown in FIG. 5. While material in the area of contact remains plastic, relative rotation between the tool joint 23 and the pipe 20 is stopped and the pipe 20 and the tool joint 23 are forced together under a greater pressure to upset the still plastic material 24 in the area of the weld. As the material of the pipe and the tool joint cools, the weld is completed. Upon removal from the friction welding apparatus, the upset 24 is machined from the now welded pipe 20 and the tool joint 23.

Figure 1:
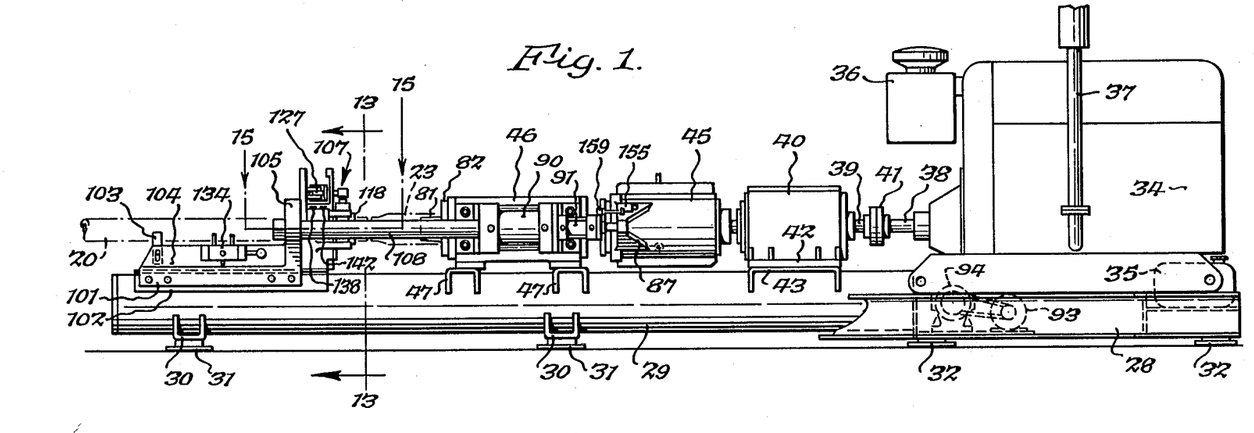
FIG. 1 is a side elevation of a friction welding apparatus with the end of an oil well drill pipe and a tool joint which are to be welded shown in broken lines.
Figure 2:
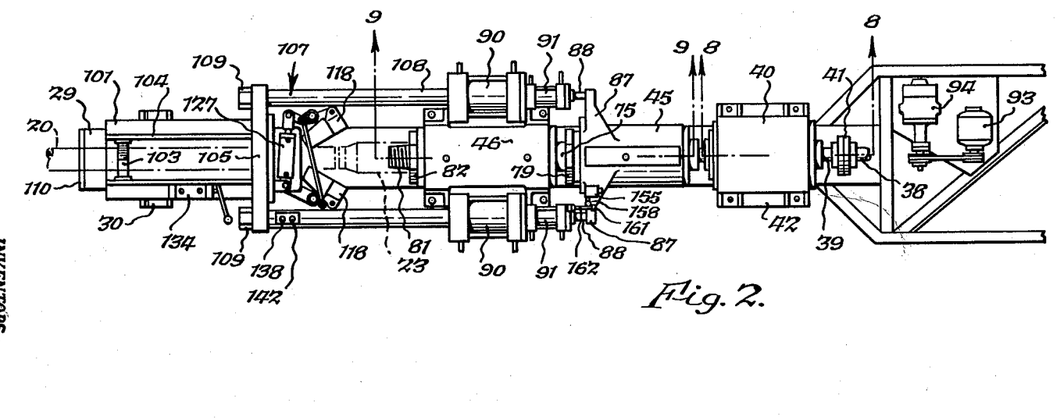
FIG. 2 is a top view of the friction welding apparatus with the drive engine removed from the frame.

Referring now to FIGS. 1 and 2, the friction welding apparatus has an end frame 28 formed of channel members. Fixed to and extending from the end frame 28 is the tubular frame member 29. Short cross channels 30 have the feet 31 fixed to them. The cross channels 30 are welded to the tubular frame member 29 to support it. The end frame 28 has the feet 32 fixed to it for support.

Mounted on the end frame 28 is a gasoline or diesel main drive motor 34 having a fuel tank 35, an air intake 36 and an exhaust 37. Extending from the main drive motor 34 is a shaft 38 which is coupled to shaft 39 of the clutch and brake unit 40 by means of the coupling 41. The clutch and brake unit 40 is fixed on top of the tubular frame member 29 by means of a mounting bracket 43 which is welded on top of the tubular frame member 29. The clutch and brake unit 40 is secured by fixing its base 42 to the top of the bracket 43.

Disposed directly in front of the clutch and brake unit 40 is the thrust bearing unit 45 and the radial bearing arbor support unit 46. The radial bearing arbor support unit 46 is secured on top of the tubular frame member 29 by means of the two support brackets 47 which are welded to the tubular frame member 29.

Figure 8:
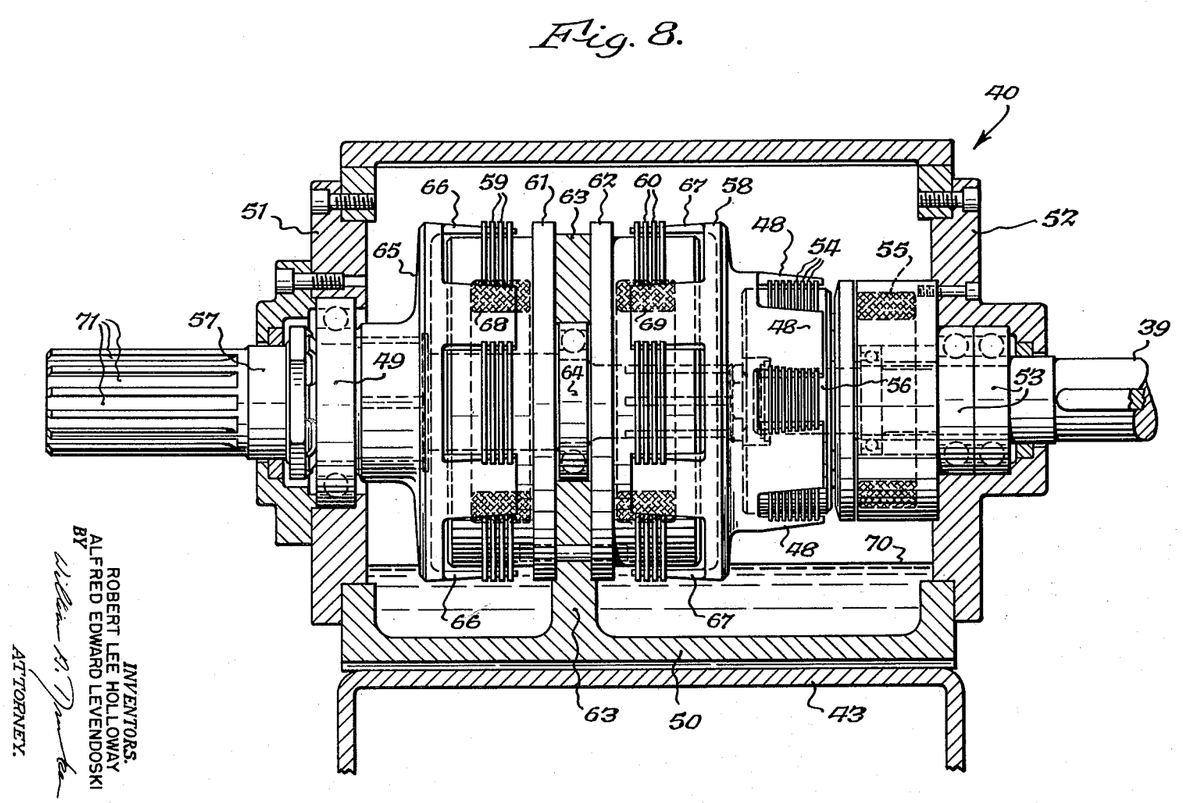
FIG. 8 is a vertical section taken on line 8—8 of FIG. 2 showing a combined clutch and brake unit.

Referring now to FIG. 8, the clutch and brake unit 40 consists of a cylindrical housing 50 which is closed by the end plates 51 and 52. Shaft 39, which is coupled to the main drive motor 34, is journaled by suitable bearings 53 in the end plate 52. Alternate clutch disks 54 are slidably fixed by means of a member 56 to the inwardly disposed end of shaft 39.

Journaled in end plate 51 by means of bearing 49 is the shaft 57. Shaft 57 terminates close to the end of shaft 39 and carries on its end the member 58 which has fingers 48 extending over the clutch disks 54 and slidably secured to the alternate clutch disks 54 which are not fixed to member 56. When coil 55 has an electric current passed through it, it will draw member 56 towards it so that adjacent clutch disks 54 will be forced together to engage each other. Thus, when coil 55 is energized, the clutch disks 54 cause shaft 39 to drive shaft 57.

Two sets of brake disks 59 and 60 have alternate brake disks fixed to the members 61 and 62. Shaft 57 passes through the members 61 and 62 to be journaled in a central web 63 by means of a bearing 64. A member 65 is fixed to shaft 57 to rotate with it. Fingers 66 and 67 on members 65 and 58, respectively, engage the alternate brake disks 59 and 60 which are not engaged by the members 61 and 62. When coils 68 and 69 are activated, they force the brake disks 59 and 60 together so that adjacent brake disks engage each other to rapidly stop the rotation of shaft 57. The cylindrical housing 50 acts as an oil reservoir so that oil 70 contained within the housing 50 may serve to lubricate and cool the clutch and brake disks 54, 59 and 60 so that these disks will not be rapidly burned up in service. The exterior end of shaft 57 carries the splines 71.

Figure 9:
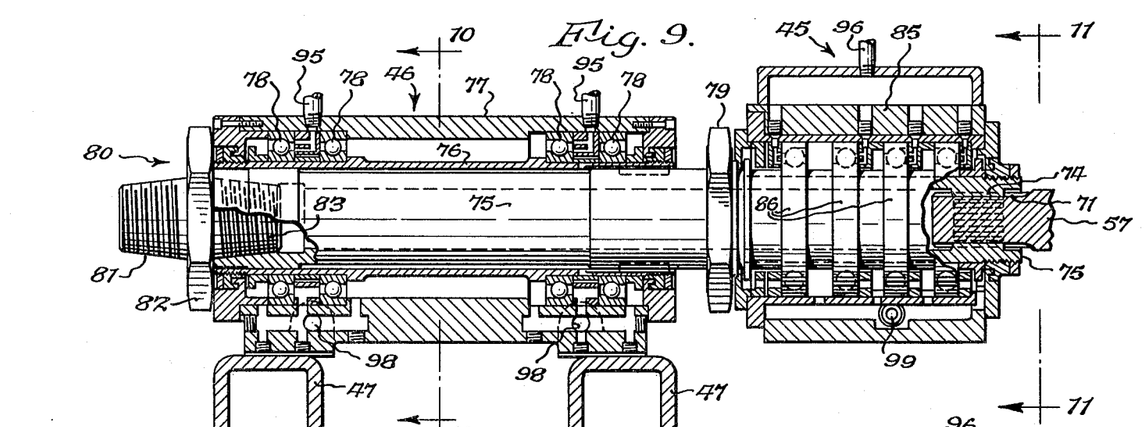
FIG. 9 is a vertical section taken on line 9—9 of FIG. 2 showing the arbor support and the thrust bearing units used to mount the arbor of the friction welding apparatus.
Figure 10:
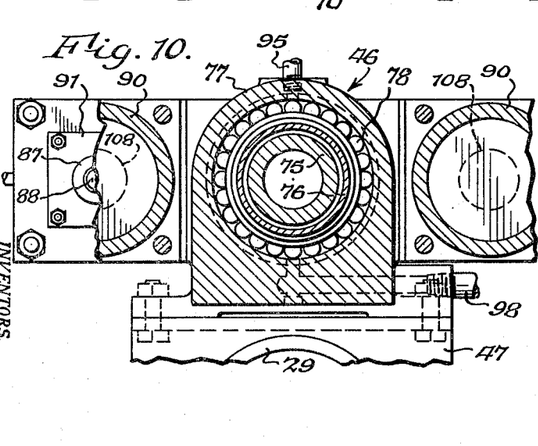
FIG. 10 is a vertical section taken on line 10—10 of FIG. 9 showing the mounting of the main hydraulic cylinders on the casing of the arbor support unit with a fragment of one cylinder and a secondary hydraulic cylinder mounted on this main hydraulic cylinder not shown in section.
Figure 11:
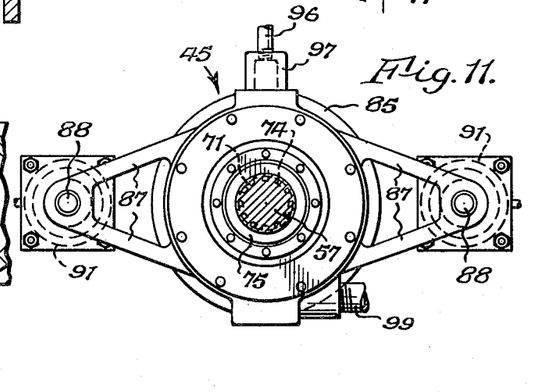
FIG. 11 is a vertical section taken on line 11—11 of FIG. 9.

Referring now to FIGS. 9, 10 and 11, the splines 71 of shaft 57 are engaged by corresponding internal splines 74 formed on the inside of the tubular arbor shaft 75. The tubular arbor shaft 75 is slidably supported within the tube 76. The tube 76 is rotatably journaled within the housing 77 of the radial bearing arbor support unit 46 by means of the ball bearings 78.

A large octagonal nut 79 is fixed to the tubular arbor shaft 75 behind the radial bearing unit 46. Turned into the front of the tubular arbor shaft 75 is the adapter 80 which has a forwardly extended threaded portion 81 formed to engage the inner surface of a female tool joint. Behind the threaded portion 81 is a large nut 82 which may be used to unscrew the adapter 80 from the arbor shaft 75 when the nut 79 is held stationary. The rearwardly extending threaded portion 83 of adapter 80 is formed so that the entire adapter 80 may be unscrewed from the tubular arbor shaft 75 and replaced by another similar adapter (not shown) which contains a threaded aperture into which a male tool joint may be turned to secure it to arbor 75.

Directly behind nut 79 and mounted about shaft 75 is the thrust bearing unit 45. This unit 45 has an outer cylindrical casing 85. A number of thrust bearings 86 secure casing 85 about the tubular arbor shaft 75. Referring to FIG. 11 and FIG. 2, it may be seen that heavy struts 87 extend from either side of the thrust bearing unit 45 and have the rods 88 fixed to them.

Referring now to FIGS. 1, 2 and 10, it may be seen that the arbor support unit 46 has the two large hydraulic cylinders 90 fixed to the housing 77. FIGS. 1, 2, 10 and 11 show that the large hydraulic cylinders 90 have the smaller hydraulic cylinders 91 fixed to their rearwardly disposed ends so that the cylinders 91, by means of the rods 88, may draw the thrust bearing unit 45 towards the arbor support unit 46 and thus slide the tubular arbor shaft 75 within tube 76 to move it forward.

As shown in FIG. 2, a pump 94 may be driven by an electric motor 93 to supply hydraulic fluid under pressure to activate the hydraulic cylinders 91. Referring again to FIG. 9, since the bearings 78 and 86 are subjected to exceedingly high speed heavy loads, suitable pressurized lubrication is introduced to the bearings 78 in the arbor support unit 46 through the tubes 95 and lubrication under pressure is introduced to the thrust bearings 86 through the tube 96 which is connected to the manifold 97. Suitable lubrication drain fittings 98 are provided in unit 46 and a lubrication drain fitting 99 is provided in unit 45.

Referring now to FIGS. 1, 2, 12 and 13, it may be seen that a drill pipe chucking unit 101 is slidably mounted on the ways 102 which are welded or secured to the tubular frame member 29. At the rearmost end of the drill pipe chucking unit 101 there is adjustably mounted the V-support block 103 between the longitudinal channel members 104 which are formed integrally with the unit 101. At the front of unit 101 there extends vertically upward the massive flange 105. The drill pipe 20 extends through an aperture 106 and is secured therein by means of the slip chuck mechanism 107 which will be described hereafter.

Figure 12:
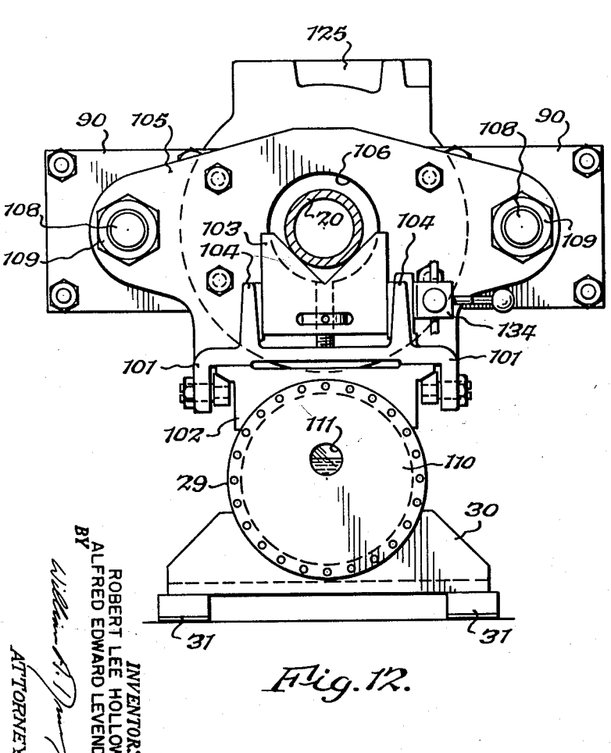
FIG. 12 is an end view of the friction welding apparatus.
Figure 13:
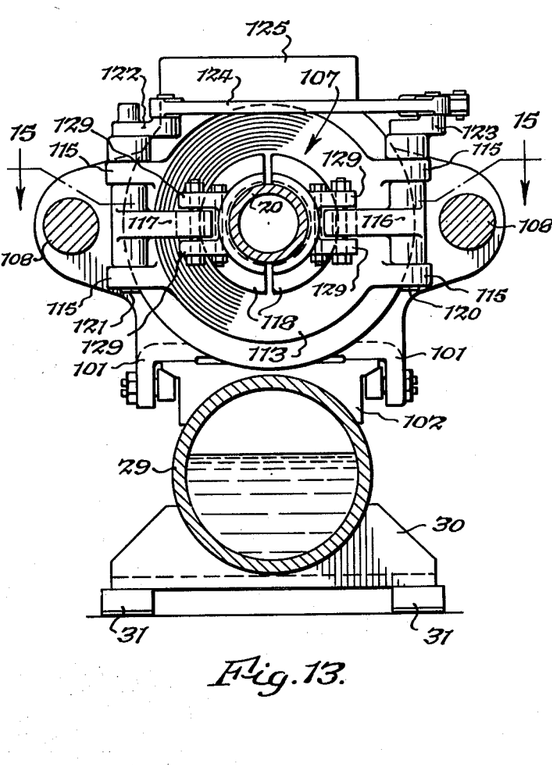
FIG. 13 is a vertical section taken on line 13—13 of FIG. 1.

Large rods 108 extend through flange 105 and into the large hydraulic cylinders 90. Thus the hydraulic cylinders 90 may be activated to draw the rods 108 inward and slide the entire drill pipe chucking unit 101 towards the arbor support unit 46. The rods 108 are fixed to flange 105 by means of the nuts 109.

As is further shown in FIGS. 12 and 13, the tubular frame member 29 is closed at both ends. At the front end it is closed by the end plate 110 which contains a small viewport 111. The tubular frame member 29 is used as an oil reservoir from which oil is circulated to the clutch and brake unit 40 which generates considerable heat during its operation. Thus the tubular frame member 29 acts as both an oil reservoir and a radiator to dissipate heat from heated oil 70 which drains into it from the clutch and brake unit 40. The viewport 111 allows operators of the welding apparatus to readily ascertain the oil level within the tubular frame member 29.

Figure 14:
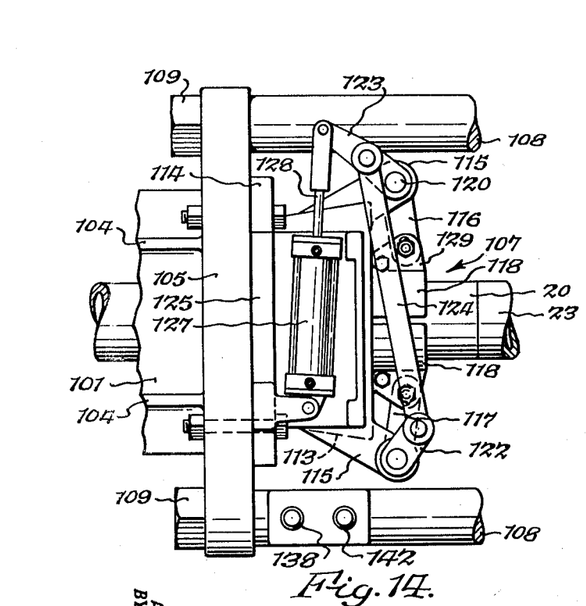
FIG. 14 is a top view of the oil well drill pipe chuck.
Figure 15:
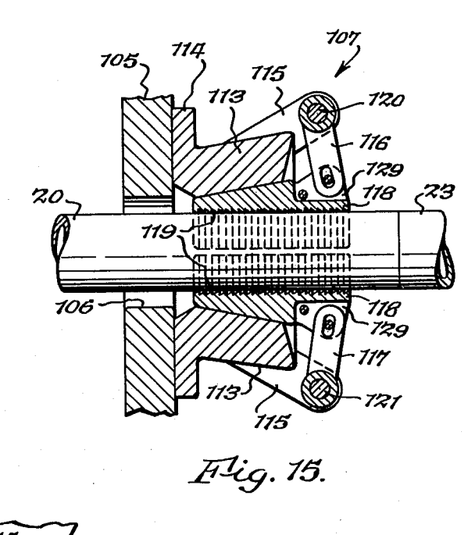
FIG. 15 is a section taken on lines 15—15 of FIG. 1.

Referring now to FIGS. 1, 2, 13, 14 and 15, slip chuck 107 operates in the following manner. A generally round block 113 is fixed to the rearwardly disposed surface of flange 105 by means of a narrow flange 114 which is formed integrally with block 113. As shown in FIG. 15, the block 113 has inwardly sloping surfaces disposed about the aperture 106 on either side of a pipe 20. Extending on both sides of block 113 are the two sets of knuckles 115. Pivotally secured between each set of knuckles are the links 116 and 117 which have the pipe jaws 118 fixed to their inwardly extending ends. The pipe jaws 118 slidably contact the inwardly sloping surface of the block 113 so that, as the jaws 118 move to the left as shown in FIG. 15, they will move together to firmly clamp a pipe 20. These pipe jaws 118 have rearwardly pitched ridges 119 formed on them to firmly grip a pipe 20 over a relatively large area.

Referring now to FIGS. 13, 14 and 15, it may be seen that the shaft 120 and 121 about which the links 116 and 117 pivot within the knuckles 115 extend above the knuckles 115. Fixed on top of shaft 121 is the short crank arm 122 and fixed on top of shaft 120 is the longer crank arm 123. A connecting link 124 extends from an intermediate portion of crank arm 123 to the end of crank arm 122. Projecting upward from the flange 114 is a rectangular extension 125 to which there is attached one end of hydraulic cylinder 127. A rod 128 extends from hydraulic cylinder 127 and is connected to the end of the crank arm 123. The ends of the links 116 and 117 are connected to the pipe jaws 118 by means of bolts and bifurcated ears 129 which are formed integrally with each jaw 118.

Therefore, referring to FIGS. 14 and 15, it may be seen that as hydraulic cylinder 127 draws rod 128 inward, it will rotate crank arm 123 and shaft 120 counter-clockwise. At the same time, connecting link 124 will rotate crank arm 122 and shaft 121 clockwise. The counter-clockwise rotation of shaft 120 and the clockwise rotation of shaft 121 will rotate link 116 counter-clockwise and link 117 clockwise. As the ends of link 116 and 117 move away from flange 105, they will draw the pipe jaws 118 outward from block 113 so that jaws 118 release pipe 20. In a like manner, when the cylinder 127 forces rod 128 outward, link 116 will rotate clockwise and link 117 counter-clockwise to force the pipe jaws 118 into the block 113 to grip a pipe 20 as the jaws 118 are wedged inward.

This invention is operated in the following manner. First, the main drive motor 34 is started and allowed to idle and warm up. A tool joint 23 is mounted on the tubular arbor shaft 75 by means of an adapter 80. The tool joint would be firmly secured into place about the threaded protrusion 81 while the nut 82 was held from rotating. A drill pipe 20 would be placed in position by laying it on the V-support block and pushing the pipe 20 through aperture 106 in flange 105. To activate cylinder 127, the manually operated valve 134 would be manipulated to activate cylinder 127. Valve 134 is shown in FIG. 1 and in FIG. 17.

Figure 18:
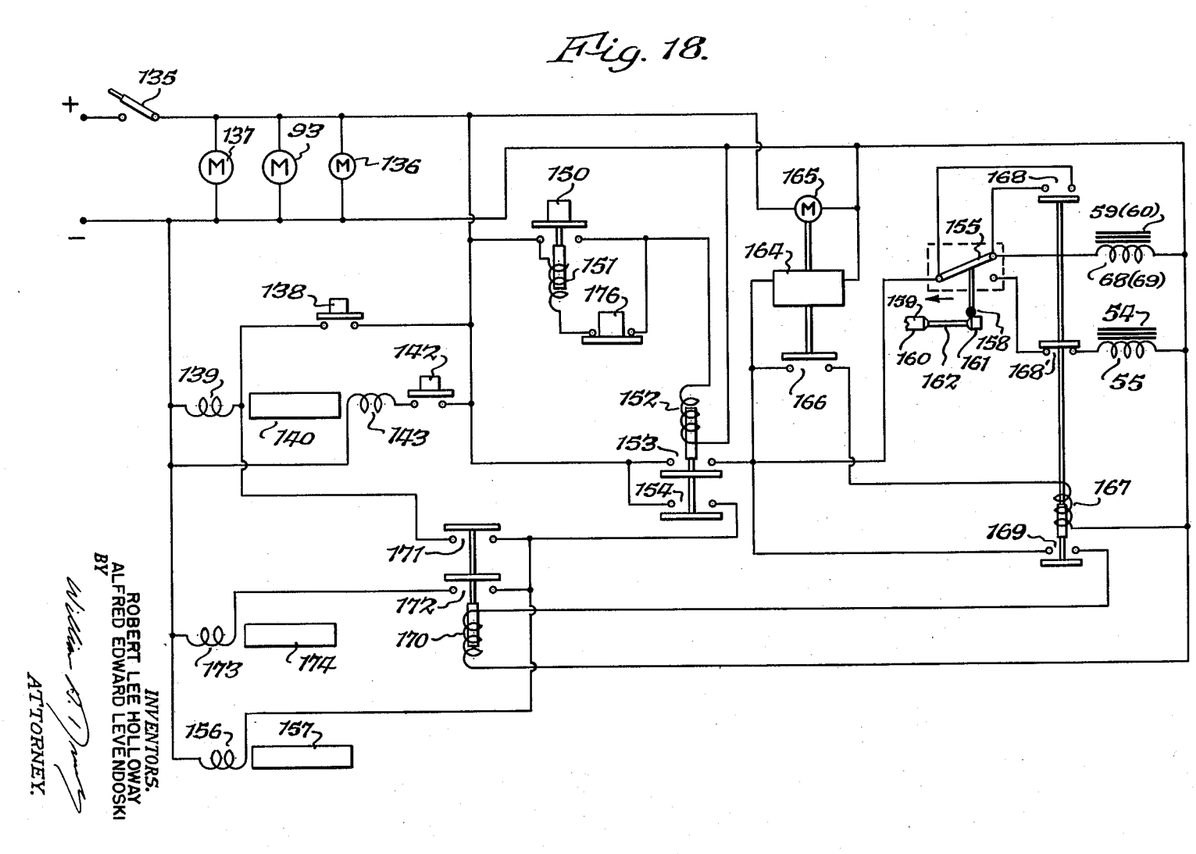
FIG. 18 is a wiring diagram for the electrical components and controls of the friction welding apparatus.

Referring now to FIG. 18, the main switch 135 has already been closed to start motor 93 which drives pump 94 to supply hydraulic fluid under pressure to the apparatus. Switch 135 also starts motors 136 and 137. Motor 136 drives a lubrication pump (not shown) which supplies lubricant under a suitable pressure to the bearings of the tubular arbor shaft 175. Motor 137 drives a pump (not shown) which circulates lubricant from the tubular frame member 29 to the clutch and brake unit 43.

Figure 17:
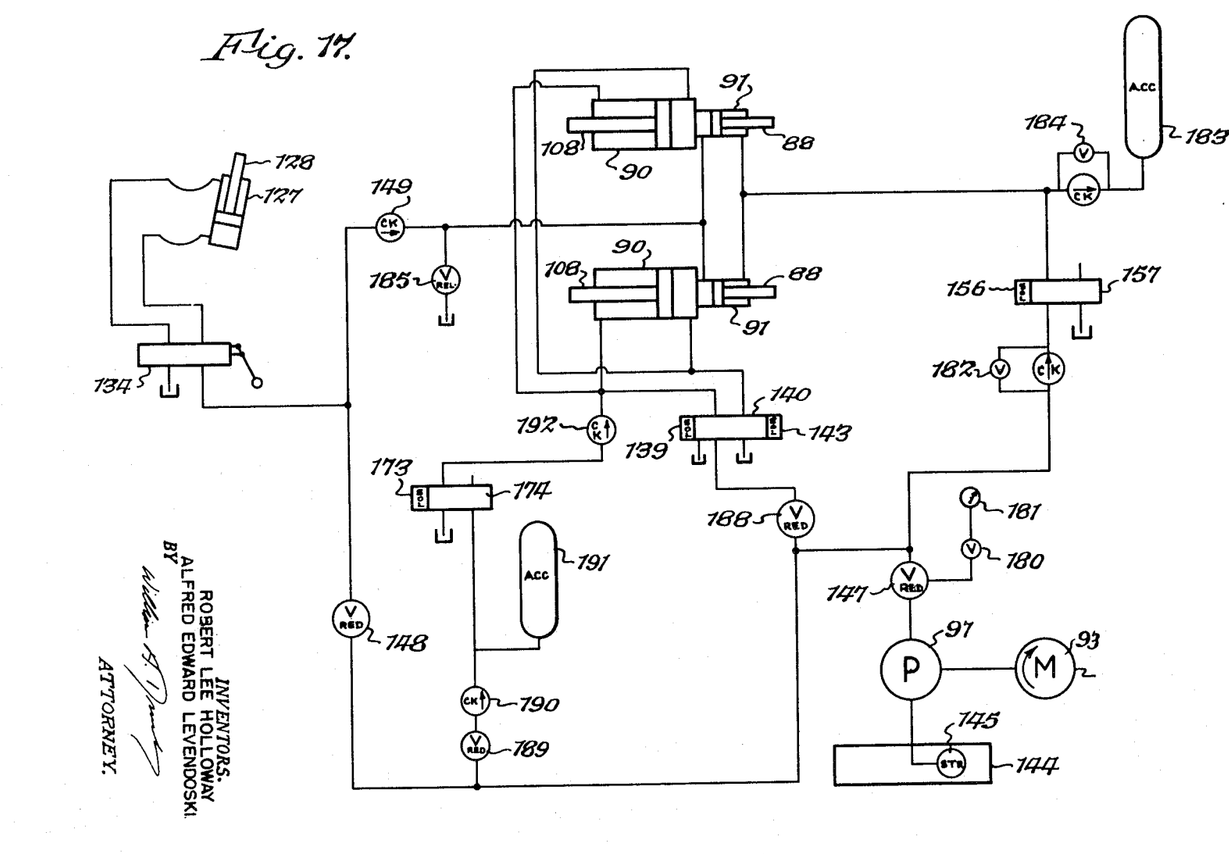
FIG. 17 is a schematic diagram of the hydraulic system of the friction welding apparatus.

Referring further to FIG. 18, a push button 138 is then depressed so that current from the D.C. current supply passes through solenoid 139. Solenoid 139 opens valve 140 so that, as shown in FIG. 17, hydraulic fluid flows into the forwardly disposed ends of cylinders 90 to draw the rods 108 into the cylinders 90.

Referring now to FIGS. 1 and 2, it may be seen that the large cylinders 90 now draw the drill pipe chuck unit 101 to the right until the drill pipe 20 butts against the tool joint 23. This pressure on pipe 20 tending to force it back through flange 105 sets the pipe jaws 118 as they wedge firmly within block 113 and grip the pipe 20. The button 142 is then pressed to pass current through the solenoid 143 which activates valve 140 to introduce fluid into the rearwardly facing ends of cylinders 90 and drain fluid from the forwardly facing ends of cylinders 90 so that, as shown in FIGS. 1 and 2, the rods 108 move the drill pipe chuck unit 101 to the left. Unit 101 is moved to the left with drill pipe 20 until there is a desired clearance between the ends of drill pipe 20 and tool joint 23.

The main drive motor 34 is now brought up to full speed. The coils 68, 69 and 55, as shown in FIGS. 8 and 18 are not yet energized so that neither the clutch plates 54 nor the brake disks 59 and 60 are engaged. Referring to FIG. 17, it may be seen that motor 93 is driving pump 94 to draw hydraulic fluid from reservoir 144 through strainer 145. Fluid from pump 201 flows through reducing valve 147 and then to the left over to reducing valve 148 which drops pressure in the hydraulic system to 70 pounds per square inch beyond it. Fluid then flows past reducing valve 148 through the check valve 149. This fluid then enters the rearwardly disposed ends of the small cylinders 91 to urge the rods 88 to the right so that, as shown in FIGS. 1, 2 and 9, the rods 88 will urge the tubular arbor shaft 75 to the right within the tube 76 so that the nut 82 rests against the end of the housing 77.

Referring again to FIG. 18, the welding cycle is started by depressing the switch buton 150 which is then held closed by its holding coil 151. Switch button 150 energizes relay 152 which closes contacts 153 and 154. Contacts 153 direct current to switch 155 which energizes coils 68 and 69 to engage the brake disks 59 and 60. Contacts 154 energize solenoid 156 which opens valve 157 as shown in FIG. 17.

As valve 157 opens, hydraulic fluid flows from pump 94 through valve 157 into the rearwardly facing ends of the small hydraulic cylinders 91 to cause the small hydraulic cylinders 91 to draw the rods 88 into them. This slowly advances the tool joint and the tubular arbor shaft 75 to the left as shown in FIGS. 1, 2 and 9.

Figure 16:
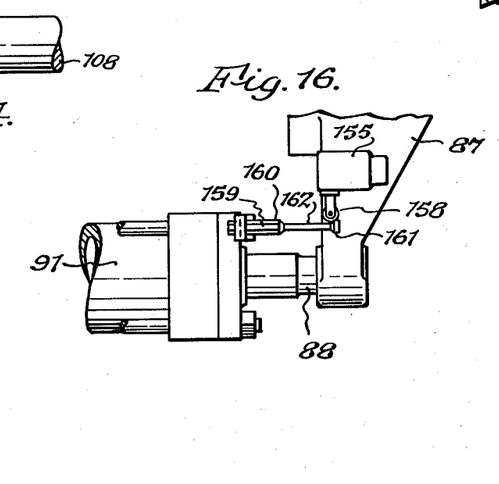
FIG. 16 is a plan view of a switch and the switch activating mechanism.

Referring now to FIG. 16, it may be seen that the struts 87 have switch 155 mounted on them. A cam follower 158 extends from switch 155 and activates it. Cam follower 158 rides on cam 159 which is fixed to the small cylinder 91 and has the two raised portions 160 and 161 on either side of a depressed portion 162. Therefore, as the small cylinders 91 advance the tubular arbor shaft 75 and the tool joint towards the end of the drill pipe 20, cam follower 158 rides down from the raised portion 161 of the cam 159.

Referring again to FIG. 18, as cam follower 158 rides down from raised portion 161 to the lower portion 162, switch 155 disconnects the brake coils 68 and 69 and energizes the clutch coils 55 to engage the clutch plates 54. As the clutch plates 54 engage, shaft 39 rotates shaft 57 which in turn drives the arbor shaft 75 to rotate the tool joint 23. As the tool joint 23 continues to rotate and be advanced, it contacts the end of the drill pipe 20 and generates heat.

Referring further to FIG. 18, it may be seen that when switch button 150 was depressed and closed contacts 153, contacts 153 also activated the timer clutch 164. When main switch 135 was closed, it had started timer motor 165 rotating. When timer clutch 164 is activated, a pre-set time interval elapses and then contacts 166 are closed. This pre-set time interval is sufficient to allow the point of contact between the tool joint and the end of the drill pipe to reach a high enough temperature to become plastic as shown in FIG. 5.

As the plastic ends of the tool joint and the drill pipe are forced together, cam follower 158 rides along over the lowered portion 162 of the cam 159. As cam 158 rides down to portion 162, switch 155 activates coil 55 to engage clutch plates 54.

Then after the pre-set interval of time has elapsed, the timer motor 165, through timer clutch 164, closes contacts 166 to energize relay 167 and close contacts 168 and 169 and open contacts 168'. The closing of contacts 168 instantly engages the brake disks 59 and 60 and the opening of contacts 168' disengages the clutch disks 55 to rapidly bring arbor 75 to a stop. Contacts 169 energize the relay 170 to close contacts 171 and 172. Contacts 172 energize solenoid 173 to open valve 174 shown in FIG. 17. Contacts 171 energize solenoid 139 to simultaneously open valve 140.

As cylinders 90 draw the rods 108 into them, the now relatively motionless drill pipe 20 and the tool joint 23 are forced together to complete the weld as shown in FIGS. 6 and 7. As pressure increases on the tool joint to force it to the right, as shown in FIGS. 1 and 2, the rods 88 are forced to the right. Referring again to FIG. 17, as the rods 88 are forced to the right, fluid flows from cylinders 91 and out through valve 157. Referring again to FIG. 18, it may be seen that the closing of contacts 172 had energized solenoid 156 to open valve 157. Therefore, when the greatest pressure is exerted by cylinders 90 to force the tool joint and the drill pipe together, the tubular arbor shaft 75, as shown in FIG. 9, is disposed as far as possible to the right and the nut 82 rests against the end of housing 77.

This feature of the invention, which allows the adapter 80 to bear on the housing 77, relieves the thrust bearing unit 45 from having to sustain the particularly heavy static loads which are encountered at the close of the welding cycle. This advantage enables the entire apparatus to be less massively constructed.

After a predetermined cooling period, which in practice runs about two minutes, the reset button 176, as shown in FIG. 18, is pressed which opens the start switch 150 to cause relays 152 and 170 to drop out to their original positions for the start of a new welding cycle.

Valve 134 may then be manually operated to release the pipe jaws 118 from the pipe 20. The pipe jaws 118 are then swung completely from within the block 113. Referring to FIG. 15, it is to be noted that the aperture 106 in flange 105 and the smallest diameter of the passage through block 113 must be large enough to allow the passage of the maximum diameter of a tool joint so that it may be removed outward from the apparatus.

Referring again to FIG. 17, to more fully explain the working of the hydraulic system of this invention, pump 94 provides hydraulic fluid from reservoir 144 at a given pressure after it passes the pressure reducing valve 147. Valve 180 may be opened so that the pressure in the hydraulic system after the pressure reducing valve 147 may be read on gauge 181. Hydraulic fluid flows from the reducing valve 147 through the flow control valve 182. The accumulator valve 157 is operated by a single solenoid and is a spring offset, four-way valve. When valve 157 is open, fluid flows to the accumulator 183 through the flow control valve 184. Fluid also flows from valve 157 to the rearwardly disposed ends of the small hydraulic cylinders 91. The forwardly disposed ends of cylinders 91 have oil trapped in them so that fluid pressure builds up in the rearwardly disposed ends of cylinders 91 and in accumulator 183 all under the control and timing of the flow control valve 182.

When pressure in the front end of the cylinders 91 builds up to 75 pounds per square inch, the fluid in these front ends of cylinders 91 will flow out of the cylinders and pass through the 75 pounds per square inch pressure release valve 185. As higher pressure builds up in the rearwardly disposed ends of the cylinders 91, this higher pressure will overcome the 75 pounds per square inch pressure in the front ends of the cylinders 91 and the resistance encountered by the rods 88 as they force the tool joint 23 against pipe 20. These rods 88 then move to the left as shown in FIG. 17 at a controlled rate as they bring the workpieces together to generate friction heat.

Fluid from pump 94 also passes through valve 147 and then through another reducing valve 188. The fluid then flows to the control valve 140 for the large cylinders 90. Valve 140 is a double solenoid, spring-centered four-way valve which, as has been described, activates hydraulic cylinders 90 to set the pipe jaws 118 and to finally force the tool joint 23 and the drill pipe 20 together to complete the weld as shown in FIGS. 6 and 7.

Fluid also flows from pump 94 through valve 147 and then through the pressure reducing valve 189, a five-pound per square inch check valve 190, and then to the accumulator 191 in which hydraulic fluid builds up to a pressure of 350 pounds per square inch, which is the pressure to which pressure reducing valve 189 is set. When valve 174 is opened, fluid within the accumulator flows through the five-pounds per square inch check valve 192 to join fluid from the main control valve 140 and flow into the front ends of the large cylinders 90. This is a large volume flow at a lower pressure to more rapidly activate cylinders 90. When sufficient fluid passes through valve 188 at a higher pressure, check valve 192 closes.

Fluid from pump 94 also passes through pressure reducing valve 147 to flow through the pressure reducing valve 148 at 70 pounds per square inch to the manual control valve 134 which operates the cylinder 127. Fluid passing the pressure reducing valve 148 at 70 pounds per square inch also flows to the 50 pound per square inch check valve 149 past a 75 pound per square inch pressure release valve 185 and then to the forwardly disposed ends of the cylinders 91 to maintain a back pressure on them from 70 to 75 pounds per square inch.

While this invention has been described and shown welding tool joints, this is exemplary as many other suitable welding operations may be made.

What is claimed is:

1. A friction welding apparatus for welding workpieces comprising, in combination, a frame, an arbor having means securing a first workpiece at one end of said arbor, arbor mounting means rotatably and slidably securing said arbor to said frame, drive means to rotate said arbor, means to stop the rotation of said arbor, means to advance said arbor in the direction of said first workpiece, workpiece holding means slidably mounted on said frame and adapted to hold a second workpiece beyond the end of said first workpiece, and means to advance with great force said workpiece holding means toward said first workpiece after actuation of said means to stop rotation.

2. A friction welding apparatus for welding workpieces comprising, in combination, a frame, an arbor, arbor mounting means rotatably and slidably securing said arbor to said frame, an adapter having means to secure a first workpiece, said adapter being mounted on said arbor to butt against said arbor mounting means, drive means, clutch means selectively engaging said arbor to said drive means to rotate said arbor, means to stop the rotation of said arbor, means to advance said arbor while rotating in the direction of said first workpiece, workpiece holding means slidably mounted on said frame and adapted to hold a second workpiece beyond the end of said first workpiece, and means to advance with great force said workpiece holding means towards said first workpiece after actuation of said means to stop rotation, said adapter on said arbor butting against said arbor mounting means as said means to advance said second workpiece holding means presses said second workpiece with great force against said first workpiece.

3. A friction welding apparatus comprising, in combination, a tubular frame, an arbor having means securing a first workpiece at one end of said arbor, arbor mounting means rotatably and slidably securing said arbor to said tubular frame, drive means mounted at one end of said tubular frame, clutch means to engage said arbor with said drive means to rotate said arbor, brake means to rapidly stop the rotation of said arbor, oil within said tubular frame, pump means drawing oil from said tubular frame to cool said brake means, drain means returning oil from said brake means to said tubular frame, means to advance said arbor while rotating in the direction of said workpiece, workpiece holding means slidably mounted on said tubular frame and adapted to hold a second workpiece beyond the end of said first workpiece, and means to advance with great force said workpiece holding means towards said first workpiece.

4. A friction welding apparatus for butt welding tubular workpieces comprising, in combination, a frame, a drive motor mounted at one end of said frame, a clutch and brake unit mounted on said frame next to said drive motor, a shaft of said clutch and brake unit extending from said clutch and brake unit and being driven by said drive motor, a second shaft extending from said clutch and brake unit, clutch means in such clutch and brake unit engaging said first and second shafts, brake means in said clutch and brake unit adapted to rapidly stop rotation of said second shaft, an arbor support unit mounted on said frame beyond said clutch and brake unit, an arbor rotatably and slidably mounted within said arbor support unit, a thrust bearing unit rotatably mounted about said arbor shaft, said arbor shaft being slidably engaged by said second shaft of said clutch and brake unit and said arbor shaft being adapted to secure a first workpiece on the end of said arbor shaft disposed away from said clutch and brake unit, means to urge said thrust bearing unit in the direction of said first workpiece, workpiece holding means slidably mounted on said frame beyond the end of said first workpiece, means on said workpiece holding means securing a second workpiece beyond the end of said first workpiece, and means extending between said workpiece holding unit and said arbor support to urge said workpiece holding means with great force towards said arbor support forcing said second workpiece against said first workpiece.

5. The combination according to claim 4 with the addition of an enlarged member on said arbor disposed behind said first workpiece and adapted to butt against said arbor support when said means extending between said workpiece holding unit and said arbor support urges said second workpiece against said first workpiece with great force.

6. The combination according to claim 4 wherein said frame is tubular and with the addition of oil in said tubular frame, means introducing oil from said tubular frame into said clutch and brake unit to cool said brake means, and drain means enabling oil which has cooled said brake means to drain back into said frame.

7. The combination according to claim 5 wherein said means extending between said workpiece holding unit and said arbor support comprises at least one hydraulic cylinder having a rod extending from said cylinder, said cylinder and said rod being attached between said workpiece holding unit and said arbor support.

8. The combination according to claim 7 wherein said hydraulic cylinder is fixed alongside said arbor support and wherein said means to urge said thrust bearing unit in the direction of said workpiece comprises at least one smaller hydraulic cylinder mounted on each of said hydraulic cylinders mounted on said arbor support, each of said smaller hydraulic cylinders having a rod connected to said thrust bearing unit.

9. A friction welding apparatus for butt welding tubular workpieces comprising, in combination, a frame, an arbor having means securing a first workpiece at one end of said arbor, arbor mounting means rotatably and slidably securing said arbor to said frame, drive means, clutch means to engage said arbor with said drive means to rotate said arbor, brake means to rapidly stop the rotation of said arbor, means to advance said arbor while said arbor is rotating in the direction of said first workpiece, a workpiece holding unit slidably mounted on said frame, a block mounted vertically on said workpiece holding member, said block containing an aperture aligned with said first workpiece and tapering outward toward said first workpiece, at least two workpiece holding jaws adapted to slidably engage the inner surface of the aperture in said block and engage a second workpiece, and means to advance with great force said workpiece holding member towards said first workpiece.

10. A friction welding apparatus for welding workpieces comprising, in combination, a frame, an arbor, arbor mounting means rotatably and slidably securing said arbor to said frame, an adapter having means to secure a first workpiece, said adapter being mounted on said arbor to butt against said arbor mounting means, drive means, means engaging said arbor with said drive means to rotate said arbor, means to stop the rotation of said arbor, means to advance said arbor in the direction of said first workpiece, a workpiece holding member slidably mounted on said frame, a block vertically mounted on said workpiece holding member and containing an aperture aligned with said first workpiece and tapered outward in the direction of said first workpiece, jaws adapted to grip a second workpiece and slidably engage the inner surface of the aperture in said block, and means to advance with great force said workpiece holding member and said block towards said first workpiece, said adapter on said arbor butting against said arbor mounting means as said means to advance said workpiece holding member and said block presses said second workpiece with great force against said first workpiece.

11. The combination according to claim 10 wherein there are at least two of said jaws and with the addition of knuckles extending outwardly and rearwardly from said block by each of said jaws, shafts through said knuckles, links fixed on said shafts and connected to said jaws, a first crank arm on one of said shafts, said crank arm extending in one direction, a second crank arm on the other of said shafts, said second crank arm extending in a direction opposite to said first crank arm, a connecting link pivotally secured between said crank arms, and means to pivot one of said crank arms, said connecting link pivoting the other of said crank arms in the opposite direction so that said links simultaneously move said jaws within the aperture in said block.

12. A friction welding apparatus for butt welding tubular workpieces comprising, in combination, a frame, a drive motor mounted at one end of said frame, a shaft rotatably journaled beyond said drive motor, clutch means to engage said shaft to said drive motor, brake means mounted on said shaft to rapidly stop the rotation of said shaft, an arbor support unit mounted on said frame beyond said shaft, an arbor rotatably and slidably mounted within said arbor support unit, a thrust bearing unit rotatably mounted on said arbor shaft, said arbor shaft being slidably engaged by said shaft and said arbor shaft being adapted to secure a first workpiece on the end of said arbor shaft disposed away from said shaft, large hydraulic cylinders mounted on each side of said arbor support unit, smaller hydraulic cylinders mounted on the ends of said larger hydraulic cylinders and having rods extending from said smaller hydraulic cylinders and connected to said thrust bearing unit, said small hydraulic cylinders selectively urging said thrust bearing unit in the direction of said first workpiece, workpiece holding means slidably mounted on said frame beyond the end of said first workpiece, and means on said workpiece holding means securing a second workpiece beyond the end of said first workpiece, said large hydraulic cylinders having rods attached to said workpiece holding means so that said large hydraulic cylinders may urge said workpiece holding means with great force towards said arbor support unit forcing said second workpiece against said first workpiece with great force.

13. The combination according to claim 12 with the addition of an enlarged member on said arbor disposed behind said first workpiece and adapted to butt against said arbor support unit when said large hydraulic cylinders urge said workpiece supporting means towards said arbor support unit and force said second workpiece against said first workpiece with great force.

14. The combination according to claim 13 with the addition of means responsive to the longitudinal motion towards said second workpiece of said arbor within said arbor support means, said means responsive to longitudinal motion of said arbor engaging said clutch means and disengaging said brake means.

15. The combination according to claim 14 with the addition of timing means which, after a pre-set interval, disengages said clutch means, activates said brake means and activates said large cylinder to move said workpiece holding means towards said arbor support unit with great force.

16. In apparatus for friction welding metal workpieces comprising means for effecting relative rubbing movement between opposed workpiece surfaces and forcing them together to generate frictional heat at the contact area to plasticize or melt the workpieces at the contact area, means for stopping the relative movement and means for applying further axial pressure between the workpieces after stopping, the improvement which comprises a timing means which after a preset interval activates the stopping means and the means for applying pressure after stopping.

17. Apparatus for friction welding comprising, a frame, opposed axially aligned workpiece holding means, means for advancing each workpiece holding means independently along said frame toward the other workpiece holding means, means for engaging the surfaces of workpieces held in each holding means in rotational rubbing contact under a first axial rubbing pressure, means for stopping relative movement between said workpiece holding means and means for applying a second higher axial pressure between said workpiece holding means after actuation of said stopping means.

References Cited by the Examiner

UNITED STATES PATENTS

| | | | |
|---|---|---|---|
| 463,134 | 11/91 | Bevington | 29—470.3 |
| 2,788,430 | 4/57 | Oadley | 113—98 |
| 2,824,535 | 2/58 | Kalbow et al. | 113—98 |
| 2,933,428 | 4/60 | Mueller | 29—470.3 |

FOREIGN PATENTS 476,480  5/29  Germany.

OTHER REFERENCES

Friction Welding of Metals by V. I. Vill, published in Russia June 25, 1959. English translation published by American Welding Society, Inc., New York.

WILLIAM J. STEPHENSON, *Primary Examiner.*

JOHN F. CAMPBELL, *Examiner.*